Dec. 3, 1968
P. E. ROCKWELL
3,413,970
ACCESSORY INSTRUMENT FOR THE MEASUREMENT
OF CENTRAL VENOUS PRESSURE
Filed April 27, 1967
2 Sheets-Sheet 1
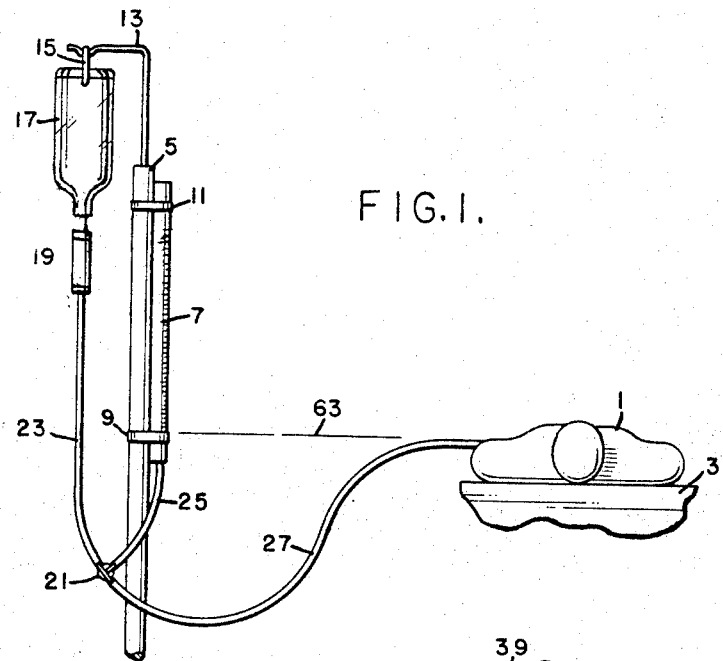
FIG. 1.
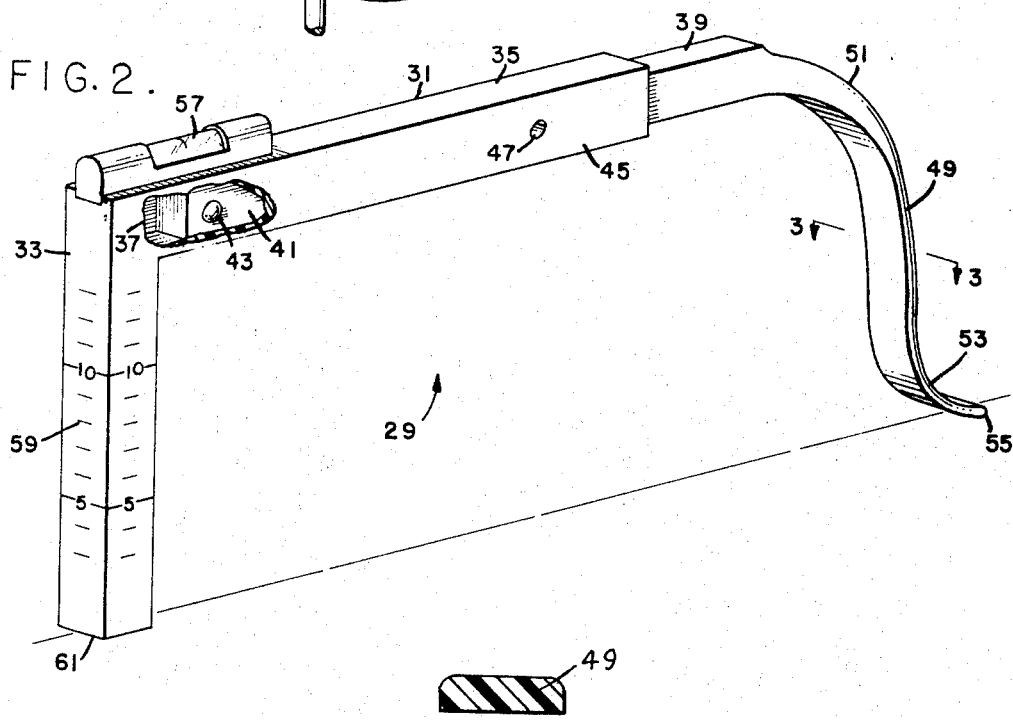
FIG. 2.
FIG. 3.
INVENTOR.
PAUL E. ROCKWELL
BY
Walter F. Wessendorf Jr.
Attorney Dec. 3, 1968

P. E. ROCKWELL 3,413,970

ACCESSORY INSTRUMENT FOR THE MEASUREMENT
OF CENTRAL VENOUS PRESSURE

Filed April 27, 1967

INVENTOR.
PAUL E. ROCKWELL
BY
*Walter S. Wasserloy Jr*
*Attorney*

United States Patent Office 3,413,970
Patented Dec. 3, 1968

3,413,970
ACCESSORY INSTRUMENT FOR THE MEASUREMENT OF CENTRAL VENOUS PRESSURE
Paul E. Rockwell, 38 Belle Ave., Troy, N.Y. 12180
Filed Apr. 27, 1967, Ser. No. 634,310
9 Claims. (Cl. 128—2.05)

ABSTRACT OF THE DISCLOSURE

An accessory instrument for use in conjunction with the measurement of central venous pressure of a patient comprising an L-shaped rigid bar having a horizontal leg mounting an air bubble level and slidingly receiving an extensible member releasingly locked in its extended position through a cooperating ball and spring detent assembly, and a vertical leg with centimeter indicia formed therein. The extensible member has a depending, integral end portion of sinusoidal configuration which wedgingly functions as a first class lever when disposed over and upon the patient's arm and beneath the patient's back.

---

This invention relates to an accessory instrument for use in conjunction with the measurement of a patient's central venous pressure (hereinafter referred to as "CVP").

The object of this invention is to solve the problems of the art to which this invention apertains of the need for an accessory instrument for the measurement of CVP, and in such connection the need that such accessory instrument be of simple but durable construction; the need that such accessory instrument be of such practical and functional simplicity that same is easy for the physician or other medical personal to use; the need that such accessory instrument have such embodied construction that accurate measurement of CVP of the supine patient is facilitated thereby, whether such supine patient is upon an operating table or in a bed with a billowing mattress; the need that such accessory instrument have embodied, functional structure such that measurement of CVP of the supine patient is and can be accomplished without movement of or disturbance to such supine patient; the need that such accessory instrument be so cooperatively and correlatively, associated, arranged and constructed with respect to its utilization with the conventional intravenous pole, manometer, etc. that employment of such accessory instrument does not obstruct the operating area of the patient during an operation for measurement of CVP, nor obstructs nor interferes with the surgeon and other operating room personnel, nor requires the operation to stop; and the need that such accessory instrument be functionally extensible to facilitate its use with the manometer carried on the intravenous pole which can be located at a nonobstructing distance from the operating table.

This object and other objects of the invention can be discerned and appreciated from the detailed specification taken in conjunction with the drawings, wherein like reference numerals refer to similar parts throughout the several views, in which:

FIG. 1 is a view depicting a patent disposed to receive a venous infusion by means of prior art facilities;

FIG. 2 is a perspective view, partly in section, of the accessory instrument of this invention;

FIG. 3 is a sectional view taken along the line 3—3 of FIG. 2;

Figure 4:
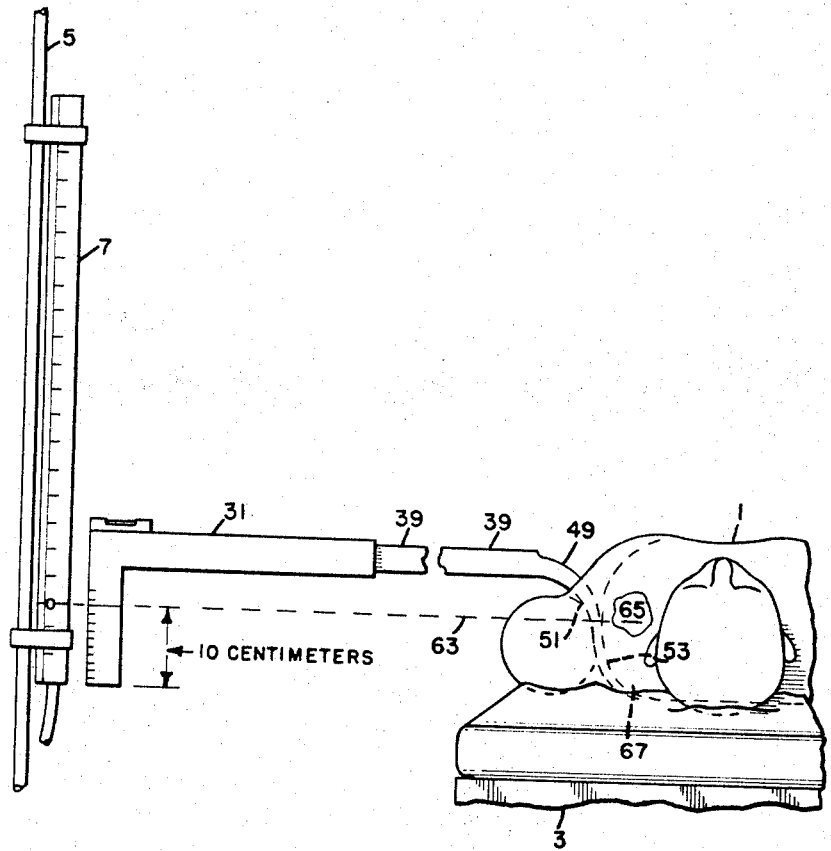
FIG. 4 is a view depicting the use of the accessory instrument relative to a patient.

In FIG. 1 of the drawings, reference numeral 1 refers to the patient lying in supine position on an operating table or bed 3 preparatory to receiving a venous infusion through the employment of the prior art facilities of an intravenous pole 5 having a manometer 7 taped thereto at 9 and 11 with its extension 13 carrying the hanger 15 of an intravenous bottle 17 disposed in inverted relationship. Bottle 17 communicates with the drip chamber 19. The three-way valve 21 has branch tubing 23, 25 and 27 which communicate, respectively, with drip chamber 19, manometer 7 and the needle (not shown) which preparatory thereto was inserted, normally in the patient's antecubital vein. And prior to the effectuation of a communicating relationship of tubing 27 with such inserted needle, a catheter (not shown) was threaded through such needle and into the patient's superior vena cava.

In FIGS. 2 and 3 of the drawings, reference numeral 29 generally refers to the accessory instrument (hereinafter referred to as "AI") of this invention comprising an L-shaped rigid bar 31 having a vertical leg 33 normal to horizontal leg 35, as viewed in FIG. 2. Horizontal leg 35 is formed with a longitudinally removed portion 37 which is complemental to and slidingly receives therein extensible member 39.

Extensible member 39 mounts on its lateral side 41 a ball 43 biased laterally outward by a spring (not shown) received in a hole (not shown) that is formed within side 41. Formed through the lateral side 45 of horizontal leg 35 is a hole 47 aligned with ball 43 such that when extensible member 39 is extended to the right, as viewed in FIG. 2, sufficiently to achieve correspondence of ball 43 with hole 47—ball 43, its biasing spring and hole 47 will function as a detent assembly to removably lock extensible member 39 in place in such extended position.

Member 39 has depending therefrom its integral end portion 49 of sinusoidal configuration. As viewed in FIG. 2, end portion 49 is curved convexly outward at 51, and thence concavely inward at 53 to terminal portion 55.

Suitably secured by friction fit or interference fit, or suitable cement within the top left side of horizontal leg 35, as shown, is an air bubble level 57. Level 57 is so arranged and disposed with respect to horizontal leg 35 that level 57 in such disposed relationship with horizontal leg 35 is in parallel correspondence with horizontal leg 35. In other words, an imaginary line coincidental with the bottom plane of level 57 will be parallel with a longitudinal line coplanar with either the top surface or bottom surface of horizontal leg 35.

Vertical leg 33 normal to horizontal leg 35 has formed therein discrete indicia 59 in the form of transverse line markings designating the centimeter distances in units of one as measured from the bottom 61 of vertical leg 33. At the five and ten centimeter distances the numerals 5 and 10 are formed in vertical leg 33 to further facilitate the reading of such indicia 59. The numeral 5 corresponds to the average ascertained, measured distance of an infant's superior vena cava from the skin of the back; and the numeral 10 corresponds to the average ascertained, measured distance of an adult's superior vena cava 65 from the skin of the back.

AI29 is so constructed and arranged that the height of vertical leg 33 and integral end portion 49 is such that an imaginary line drawn from the bottom 61 of vertical leg 33 to the terminal portion 55 of integral end portion 49 will be parallel with any line coplanar with either the top or bottom surfaces of horizontal leg 35 or extensible member 39.

The conventional procedure followed to effect CVP measurement of the patient is as follows: First the physician ascertains by measurement the anterior-posterior diameter of the patient's chest, half of which measurement is the reference locus of the vertical centimeter distance of the patient's superior vena cava 65 from the skin of the patient's back. If the level line 63 passes through such ascertained reference locus of the patient's superior vena cava 65 (hereinafter referred to as "SVC") and the manometer is so vertically disposed that this level line 63 passes through the zero point on the manometer's centimeter scale indicating centimeters of water, then accurate measurement can be made of the patient's CVP. Next the three-way valve 21 is disposed in such position that communication of tubing 25 to manometer 7 is closed and communication of intravenous bottle 17 through tubing 23 and 27 is opened thereby feeding the patient venous infusion fluid from intravenous bottle 17. Then the three-way valve 21 is disposed in such position that communication from intravenous bottle 17 through tubing 27 to the patient is shut off and communication from intravenous bottle 17 through tubing 23 and tubing 25 to manometer 7 is opened thereby filling the manometer with venous infusion fluid. Then the three-way valve 21 is disposed in such position that the only communication open is from manometer 7 through tubing 25 and 27 to the patient; hence the patient is being fed venous infusion fluid from the manometer 7. The fluid in the manometer 7 will level itself shortly and that liquid line of venous infusion fluid in the manometer 7 will be the patient's CVP as measured in centimeters of water.

It should be appreciated that if the manometer's zero point is disposed below level line 63, then hydrostatic pressure will cause the CVP to give an inaccurate reading on the manometer's centimeter scale which will be greater than such CVP actually is; if, on the other hand, the manometer's zero point is disposed above this level line 63, then hydrostatic pressure will cause the CVP to give an inaccurate reading on the manometer's centimeter scale which will be less than such CVP actually is. Also it should be appreciated that an inaccurate reading of CVP will similarly result when the measurement of the antereoposterior diameter of the patient's chest is not made correctly, or the reference locus of the patient's SVC 65 is approximated.

Pre-operatively, operatively and post-operatively, the patient's CVP should range in measurement above 5 centimeters of water but not more than 15 centimeters of water. When CVP is less than the minimum critical range, resort is made to the infusion of venous fluid and blood to raise the CVP.

In the past, the physician and other medical personnel have utilized eye sighting to line up the zero point of the manometer's centimeter scale with the supposed level line running to the patient's SVC 65. The inaccuracy resulting from eye sighting ranges to 8 centimeters on either the plus or minus side of the zero point whereat such zero point should actually and accurately be disposed.

In the past, it has been proposed to utilize a string and a carpenter's level in cooperation therewith to line up the patient's SVC 65 with the zero point of the manometer's centimeter scale. The inaccuracy resulting from such string and carpenter's level ranges to 5 centimeter's on either the plus side or minus side of the zero point whereat such zero point should actually and accurately be disposed, with compounding of such error by inaccurate disposition of one end of such string approximately where the reference locus of the patient's SVC 65 is located. In this method it is difficult for an individual to hold with outstretched arms the ends of the string, keep the string in level disposition by reference to the level and maintain the ends of such string at the supposed reference locus of the patient's SVC 65 and the zero point of the manometer's centimeter scale. It would further appear that at least two persons must assist in this method to achieve some semblance of accuracy. This method has another shortcoming in that the patient must be undraped and the approximated or ascertained reference locus of the patient's SVC 65 is not reproducible for facilitation of subsequent measurement of the patient's CVP.

In the past, it has also been proposed to utilize an L-shaped device with a horizontal leg and a vertical leg. The horizontal leg is disposed under the patient's back and the vertical leg carries the zero point of a centimeter scale 10 centimeters above the horizontal leg. While this proposal has merit, its shortcomings lie in the fact that SVC reference loci of patients are not uniform 10 centimeters measured from the skin of the back, but vary from patient to patient; accordingly, 10 centimeters cannot be accurately relied upon. And, placement of the horizontal leg beneath a patient lying upon a billowing mattress will result in further inaccuracy in the CVP measurement. In an operating room the patient is draped and there is little room available around the operating area of the patient to clutter up and obstruct such operating area with an L-shaped device to take CVP reading. To utilize such an L-shaped device in an operating room and to dispose its horizontal leg beneath the back of the supine patient would require the cessation of the operation, the undraping of the patient, the disturbance to the patient by the necessity of lifting such patient with the assistance of several of the operating room personnel in order to dispose the horizontal leg beneath such patient's back. And while all of this procedure is being followed as described, there exists the likelihood that such undraped patient will be bacterially contaminated. In addition to the variation of adults' SVC reference loci, the 10 centimeters arbitrary distance of this device's centimeter scale zero point would be highly inaccurate for infants whose SVC reference loci range around 5 centimeters.

It should be appreciated that the AI of this invention is preferably made of suitable plastic type material that is adapted for sterilization to thereby obviate any bacterial contamination resulting from its use.

After the physician has ascertained the SVC reference locus distance from the skin of the patient's back, the physician transposes such discrete distance to the same centimeter distance found as an indicium on the indicia 59 formed on vertical leg 33 in units of centimeters as measured from bottom 61. Then the physician disposes the terminal portion 55 in contiguous relationship with the skin of the supine patient's back 67, disposes the vertical leg 33 adjacent to the manometer 7 and disposes the horizontal leg 35 level by reference to the air bubble level 57. The physician then lines up the manometer 7 and vertically disposes same in taped position such that its zero point will coincide with the SVC reference locus distance transposed by the physician on that discrete indicium of indicia 59 on vertical leg 33. Thereafter, the conventional procedure described to effect CVP measurement is followed with the attribute that such measurement will be accurate, and with the further attribute that such discrete indicium is reproducible with reference to such patient in the event and likelihood that further CVP readings are to be taken.

It should be appreciated that the extensibility feature of AI29 with its extensible member 39 relative to horizontal leg 35 allows the intravenous pole 5 to be disposed at a non-interfering and non-obstructing distance away from the supine patient whether the CVP measurement is taken pre-operatively, operatively or post-operatively. In its closed position the extensible member 39 is disposed as far to the left as possible with respect to horizontal leg 35, as viewed in FIG. 2, and AI29 will be approximately 1¾ feet in length; and in its fully open position and locked position, the extensible member 39 will be disposed as far to the right as possible with respect to horizontal leg 35, as viewed in FIG. 2, and AI29 will be approximately 3 feet in length.

AI29 of this invention can be accurately utilized with reference to a supine patient lying on an operating table or on a bed, and whether other portions of which are elevated or depressed, and whether or not the patient is lying upon a billowing mattress. The integral end portion 49 is disposed over the patient's arm, then between the patient's arm and body, and then the terminal portion 55 is disposed in contiguous relationship with the skin of the patient's back 67. It should be appreciated, as is shown discernably in FIG. 4, that in such described disposition of the integral end portion 49 with reference to the patient's arm, body and skin of the back 67 that the convexly curved portion 51 will be in abutting relationship with the arm of the patient and the concavely curved portion 53 will be in abutting relationship with the body of the patient. Hence, the integral end portion 49 will have surface contact with the patient's arm and body to wedgingly function as a first class lever with the fulcrum being the patient's arm, the load being the patient's back 67 and the effort being the manipulation of AI29 in the region of the L-shaped rigid bar 31.

It should be appreciated that by the construction and arrangement of integral end portion 49 to function as a first class lever a minimum of effort is required for the physician to accurately manipulate the L-shaped rigid bar 31 relative to the manometer 7 in the measurement of CVP.

It should be appreciated that by the utilization of this AI29 the CVP can be measured without moving, lifting or otherwise disturbing the patient. By utilization of this AI29 the patient need not be undraped, the operation need not stop while measurement of CVP is taken; nor will the operating area be obstructed or otherwise interferred with while measurement of CVP is being taken; nor will the surgeon and other operating room personnel be obstructed or otherwise interferred with while CVP is being taken. Furthermore. it should be appreciated that by use of this AI29 the measurement of CVP can be accurately made by only one individual, and CVP measurement can be accurately made whether the patient is an adult, child or infant.

The need for accuracy in the measurement of CVP cannot be emphasized and stressed sufficiently. Pre-operatively, operatively and post-operatively CVP should range above 5 centimeters of water but not above 15 centimeters. As an example, during an operation a drop in CVP can be attributed to the patient hemorrhaging or the induction of anesthesia of the type which causes vasodilation and lowers the CVP. If the zero point on the manometer's centimeter scale is disposed below the level line 63, the hydrostatic pressure will effect an erroneously high CVP measurement, and wherefrom such safe CVP measurement could mask an actual CVP of less than 5 centimeters with the result that the patient could die of shock. That is a reason why resort is made to infusion of venous fluid and blood to raise the CVP to a safe level. As a further example, during an operation a rise of CVP can be attributed to induction of anesthesia of the type which causes vasoconstriction and raises the CVP. If the zero point on the manometer's centimeter scale is disposed above the level line 63, the hydrostatic pressure will effect an erroneously low CVP measurement, and wherefrom such safe CVP measurement could mask an actual CVP of more than 15 centimeters with the result that the patient could die from polmonary edema.

These two cursory examples should further serve to emphasize another salient feature and functional attribute of this AI29 over prior art; and that salient feature is the very rapidity with which this AI29 can be utilized for accurate CVP measurement by only one individual, without disturbing, moving or lifting the patient, without undraping the patient, without obstructing or interfering with the operating area, without stopping the operation, and without obstructing or interfering with the surgeon and other operating room personnel.

It is within the concept of this invention to construct and embody the horizontal leg 35 and the extensible member 39 as a one piece, non-extensible integral member.

Having thusly described my invention, I claim:

1. An accessory instrument for use with a manometer in conjunction with the measurement of a patient's central venous pressure; said accessory instrument comprising a rigid bar having an end portion of sinusoidal configuration; said sinusoidal end portion, when disposed in contiguous relationship with the patient's arm, body and back, being adapted to function as a first class lever with the fulcrum being the patient's arm, the load being the patient's back and the effort being the manipulation of the accessory instrument in the region of its rigid bar.

2. An accessory instrument in accordance with claim 1, wherein said accessory instrument further comprises level means, and wherein said rigid bar carries said level means.

3. An accessory instrument in accordance with claim 1, wherein said accessory instrument further comprises an extensible member carrying said sinusoidal end portion.

4. An accessory instrument in accordance with claim 1, wherein said accessory instrument further comprises an extensible member carrying said sinusoidal end portion, and wherein said rigid bar receives said extensible member.

5. An accessory instrument in accordance with claim 1, wherein said accessory instrument further comprises an extensible member carrying said sinusoidal end portion and a releasable locking means, wherein said rigid bar receives said extensible member, wherein said extensible member is adapted for extension to a locking position, and wherein said locking means releasably locks said extensible member in its extended position.

6. An accessory instrument in accordance with claim 1, wherein said rigid bar is L-shaped. and wherein said L-shaped rigid bar has a vertical leg and a horizontal leg.

7. An accessory instrument in accordance with claim 1, wherein said rigid bar is L-shaped, wherein said L-shaped rigid bar has a vertical leg and a horizontal leg, and wherein said vertical leg has formed therein discrete indicia of centimeter distances.

8. An accessory instrument in accordance with claim 1, wherein said accessory instrument further comprises level means and an extensible member carrying said sinusoidal end portion, wherein said rigid bar carries said level means and wherein said rigid bar receives said extensible member.

9. An accessory instrument in accordance with claim 1, wherein said accessory instrument further comprises level means, an extensible member carrying said sinusoidal end portion and a releasable locking means, wherein said rigid bar carries said level means, wherein said rigid bar receives said extensible member, wherein said extensible member is adapted for extension to a locking position, wherein said locking means releasably locks said extensible member in its extended position, wherein said rigid bar is L-shaped, wherein said L-shaped rigid bar has a vertical leg and a horizontal leg, and wherein said vertical leg has formed therein discrete indicia of centimeter distances.

References Cited
UNITED STATES PATENTS

| | | | |
|---|---|---|---|
| 1,830,829 | 11/1931 | Eyster | 128—2.05 |
| 2,437,861 | 3/1948 | Rohr | 128—2.05 |
| 3,124,133 | 3/1964 | Marbach | 128—214 |

RICHARD A. GAUDET, *Primary Examiner.*

S. BRODER, *Assistant Examiner.*